Oct. 21, 1969  J. S. PAGE, JR  3,473,606
PRE-CHARGED PRESSURE RESPONSIVE SAFETY VALVE
Filed Sept. 29, 1965  7 Sheets-Sheet 2
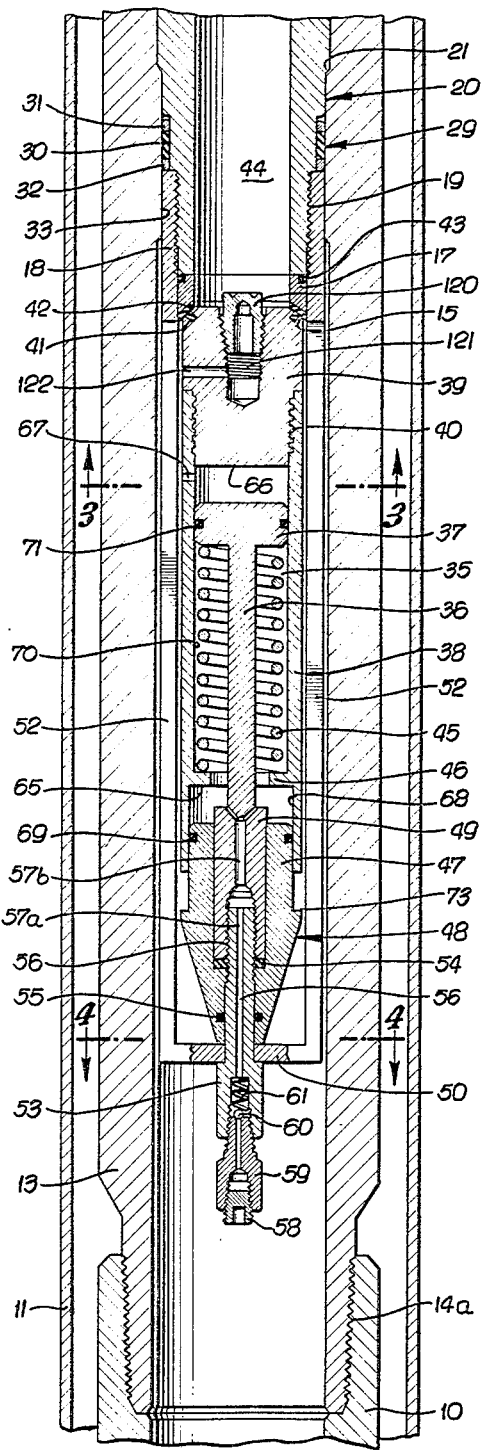
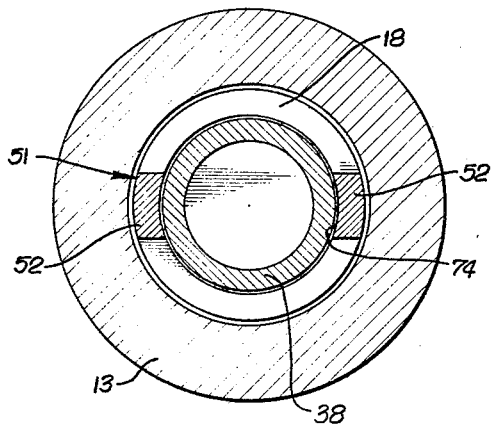
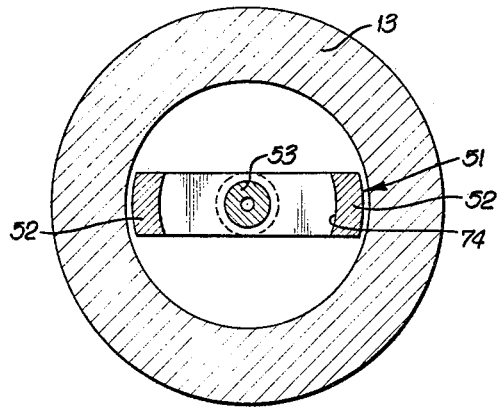
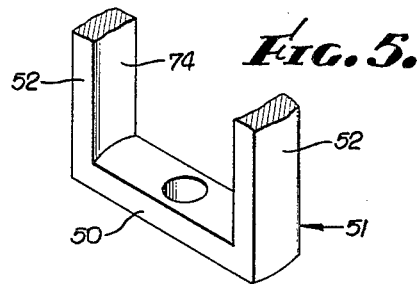
INVENTOR.
JOHN S. PAGE, JR.
By *White & Haefliger*
ATTORNEYS.

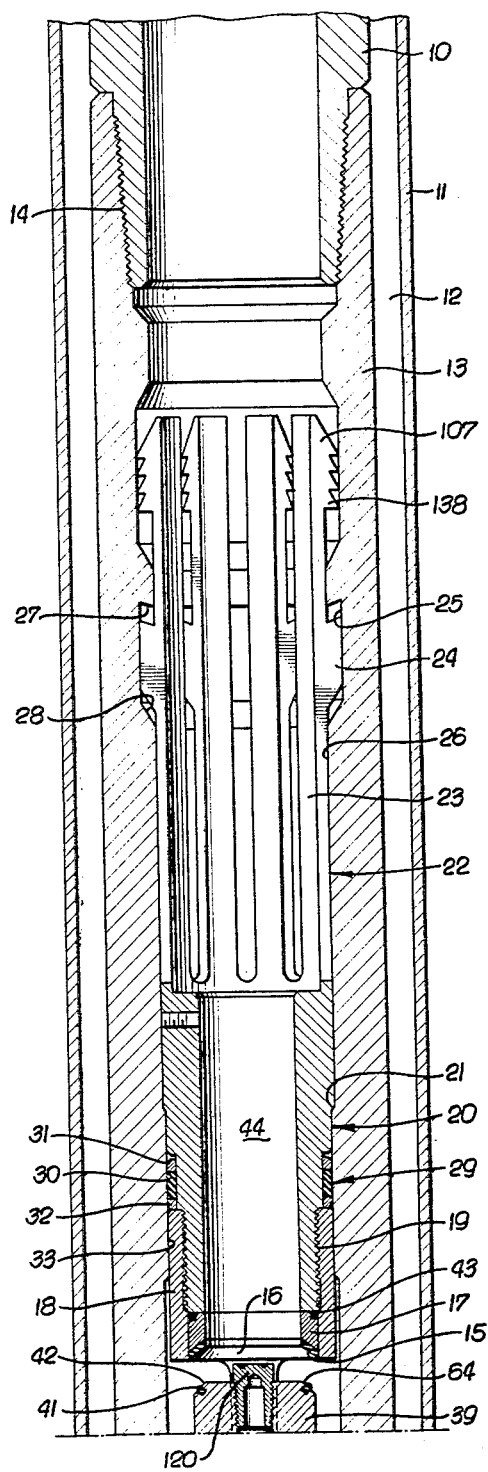

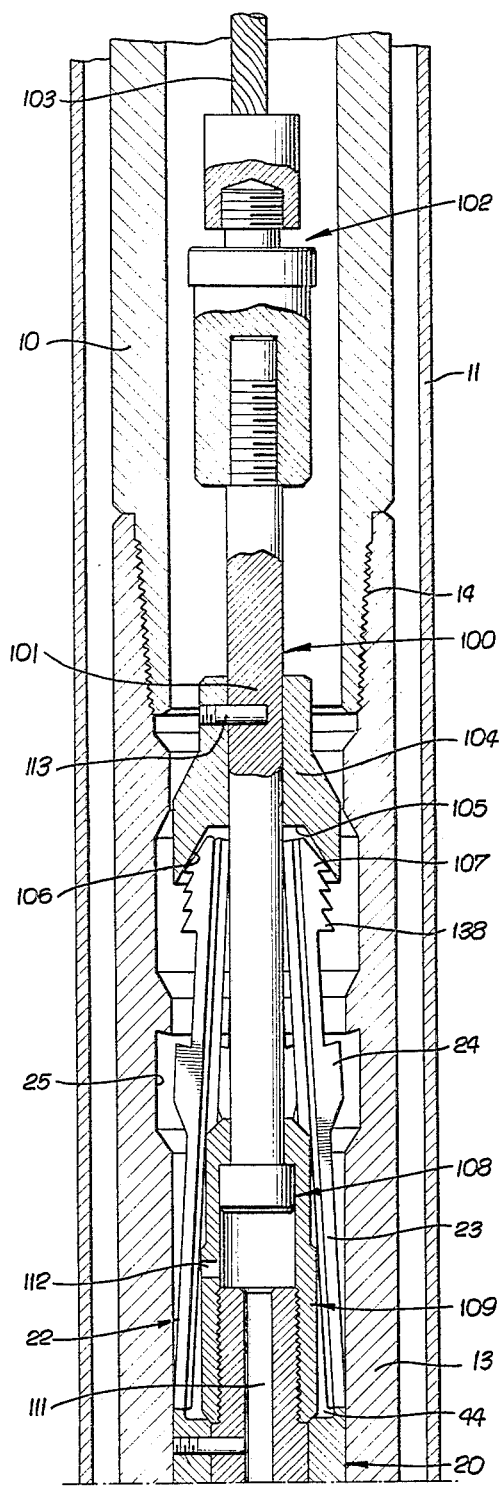

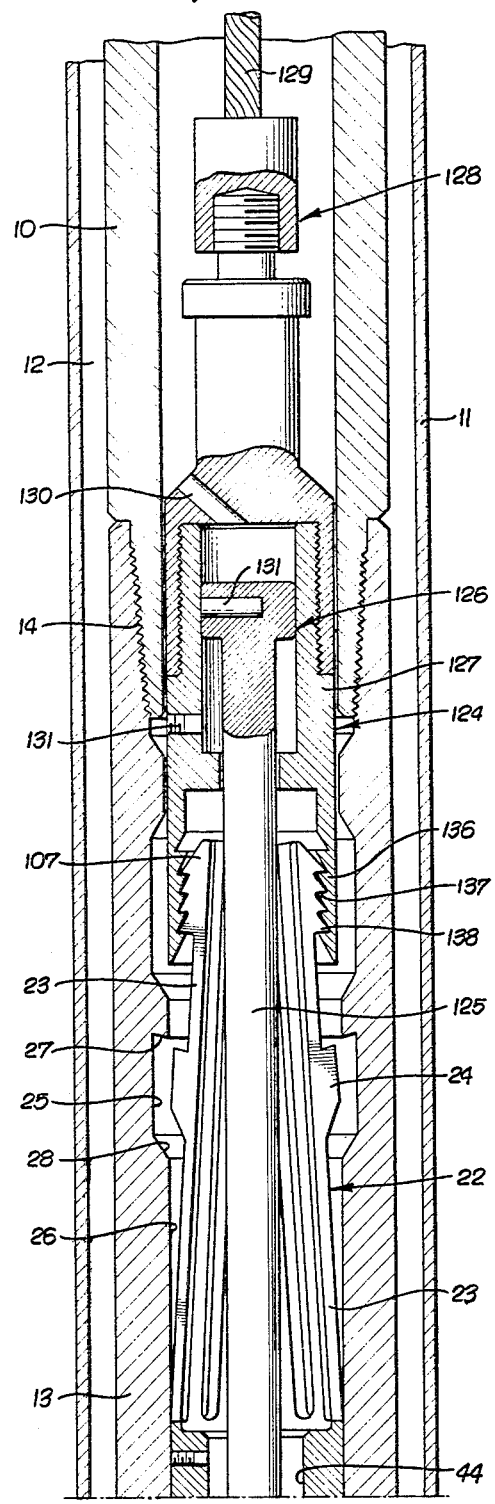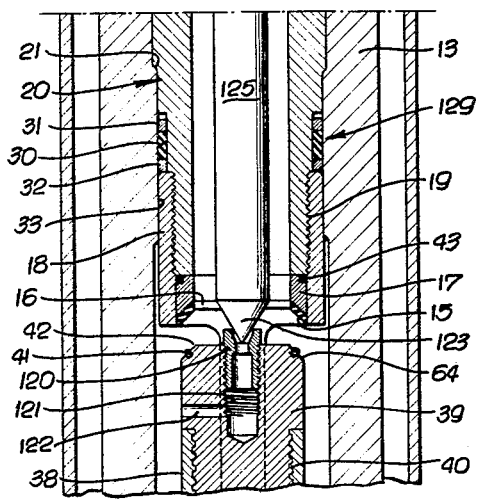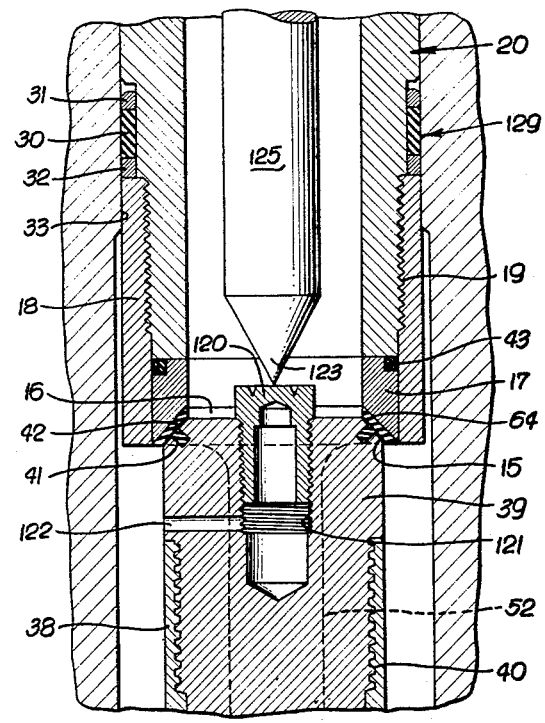

INVENTOR.
JOHN S. PAGE, JR.
By White & Haefliger
ATTORNEYS.

Oct. 21, 1969     J. S. PAGE, JR     3,473,606
PRE-CHARGED PRESSURE RESPONSIVE SAFETY VALVE
Filed Sept. 29, 1965                    7 Sheets-Sheet 6

INVENTOR.
JOHN S. PAGE, JR.
By White & Haefliger
ATTORNEYS.

Oct. 21, 1969  J. S. PAGE, JR  3,473,606
PRE-CHARGED PRESSURE RESPONSIVE SAFETY VALVE
Filed Sept. 29, 1965  7 Sheets-Sheet 7
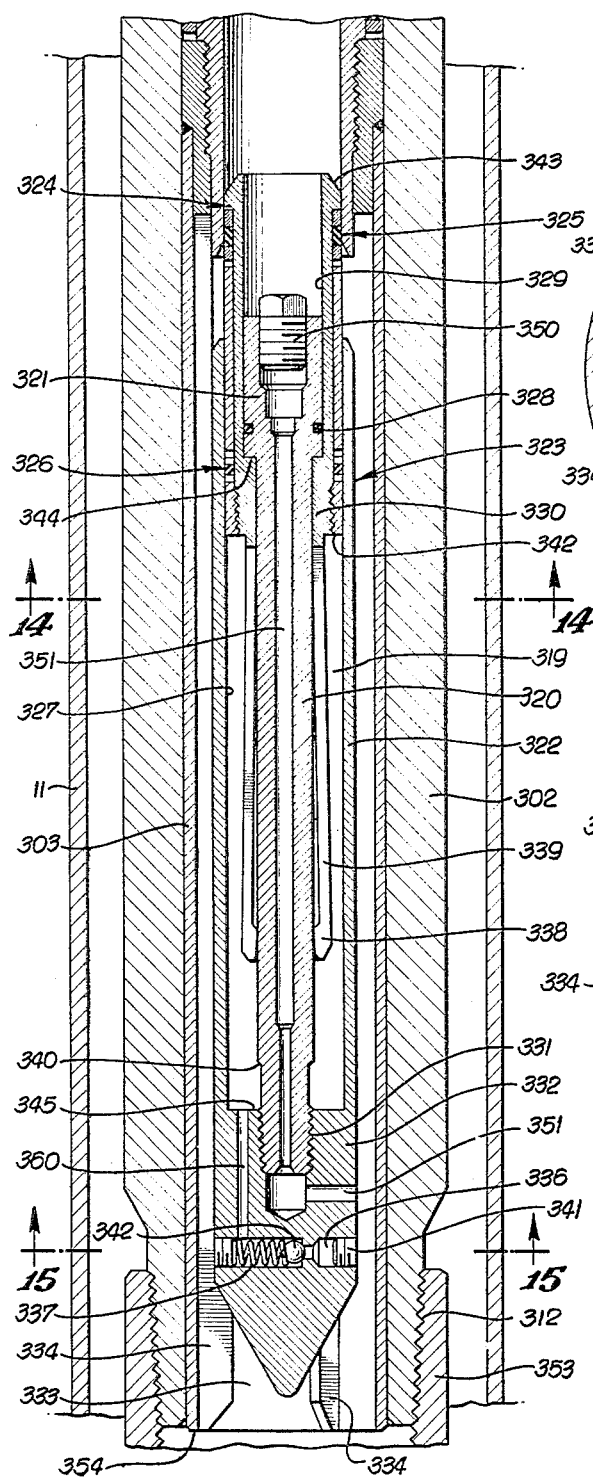
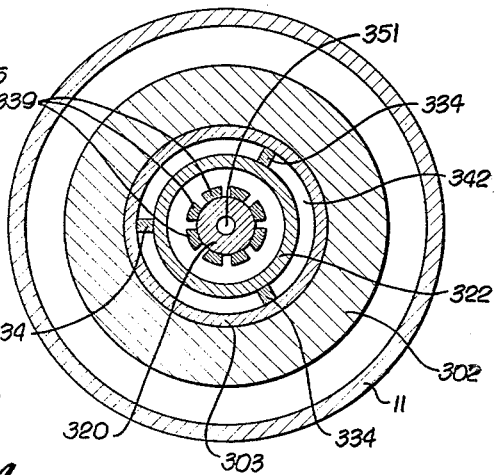
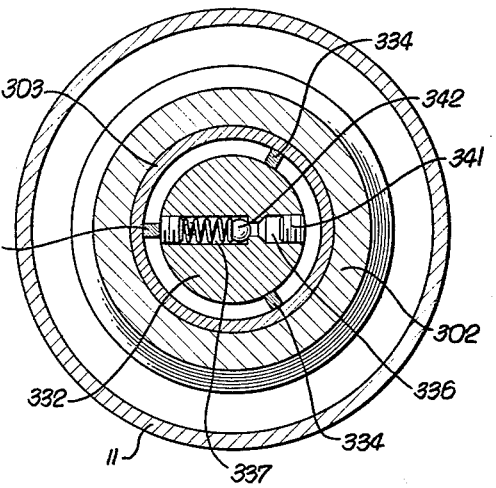
INVENTOR.
JOHN S. PAGE, JR.
By White & Haefliger
ATTORNEYS.

United States Patent Office 3,473,606
Patented Oct. 21, 1969

3,473,606
PRE-CHARGED PRESSURE RESPONSIVE SAFETY VALVE
John S. Page, Jr., Long Beach, Calif., assignor, by mesne assignments, to Cook Testing Co., Long Beach, Calif., a corporation of California
Filed Sept. 29, 1965, Ser. No. 491,192
Int. Cl. E21b 41/00; F16k 13/04, 17/04
U.S. Cl. 166—53                                                                18 Claims

ABSTRACT OF THE DISCLOSURE

The disclosed sub-surface safety valve includes a pre-charge fluid pressurized chamber; a valve plug; piston surfaces exposed to pressure within the chamber and to well fluid pressure outside the chamber for effecting relative closure of the plug toward a seat to control well fluid flow through a port in response to well fluid pressure drop below a predetermined value; and yieldable means located to resist such relative closure of the plug toward the seat whereby the pre-charge fluid pressure in the chamber may be set near the pressure of well fluid flowing through the port without effecting such relative closure.

---

Figure 9:
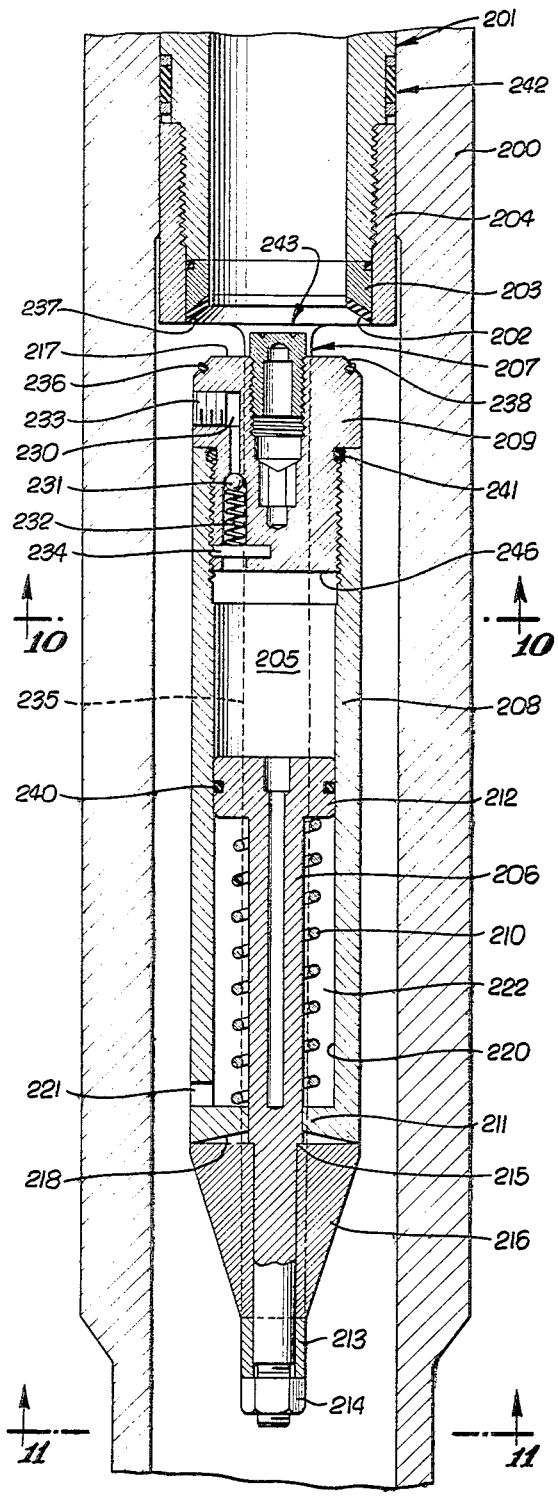

This invention relates generally to safety valves, and more particularly concerns what may be characterized as pre-charged pressure responsive safety valves for use in oil and gas wells.

It is a major object of the invention to provide an unusually advantageous safety valve assembly operable to automatically shut-in a well in the event of damage to the well head that would cause a decline in tubing pressure below the closing pressure of the valve. Prior art valves of which I am aware do not incorporate the unusual combinations and sub-combinations of features of construction, mode of operation and results embodied in the present valve as will appear.

Basically, the assembly comprises tubular means with a port forming seat therein, and control means within the tubular means to control the flow of fluid through the port, the control means forming a pre-charged fluid pressurized chamber and the control means including a plug and having piston surfaces respectively exposed to the pressure within the chamber and to the pressure of well fluid within the tubular means but outside the chamber for effecting relative closure of the plug and seat to restrict well fluid flow through the port in response to a drop in well fluid pressure below a predetermined value; also, the control means may include yieldable means such as a spring or collet located within the tubular means to resist closure of the plug toward the seat. Typically, the valve chamber may be pre-charged to substantially the same pressure as the well fluid flowing pressure at the valve location, so that after installation of the valve in a well and after the well is flowing, there is substantially no differential pressure between the pre-charge fluid and the well fluid pressure in the tubing. As a result there is little or no possibility of pressure leaking in or out of the pre-charge chamber, so that the possibility of malfunction due to loss of pre-charge pressure is practically eliminated.

Further, when the tubing fluid pressure is equalized above and below the valve location, the valve will open. If it is not possible to equalize from the surface, an equalizing plug provided in the valve nose plug can be fractured by a pulling and equalizing tool, thereby by-passing well fluid pressure through the valve plug when the plug is closed on the seat, and equalizing the well pressure above and below the seat so the valve will open.

Also, installation and removal of the valve is accomplished under pressure by wireline.

Additional objects of the invention include the provision of a carrier inserted within a tubular body to form the tubular means, the seat and control means being supported on the carrier; a collet incorporated with the carrier and having spring fingers releasably attachable to the tubular body; and running tool projecting within the collet and attached to it for shear release, the running tool releasably urging the spring fingers inwardly and blocking relative closing of the spring and seat; the location of the pre-charge chamber at the plug side of the seat so as not to interfere with the running tool; the provision of a pulling tool projecting within the collet to penetrate the frangible element, and also urging the spring fingers inwardly following fracture of the element; and the provision of a carrier sleeve or cage extending below the seat and within which the plug is vertically movable, the control means having a central stem supported by the cage or sleeve and a piston on the stem and acting with it to form the pre-charge chamber.

Figure 10:
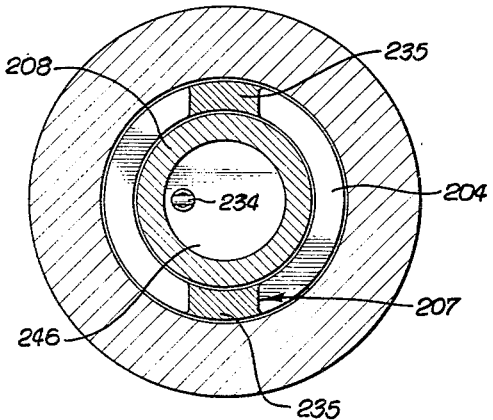
Figure 11:
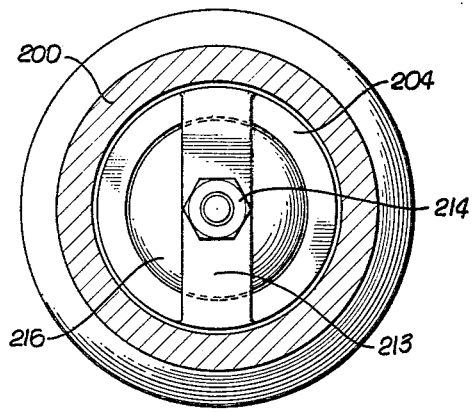
Figure 12A:
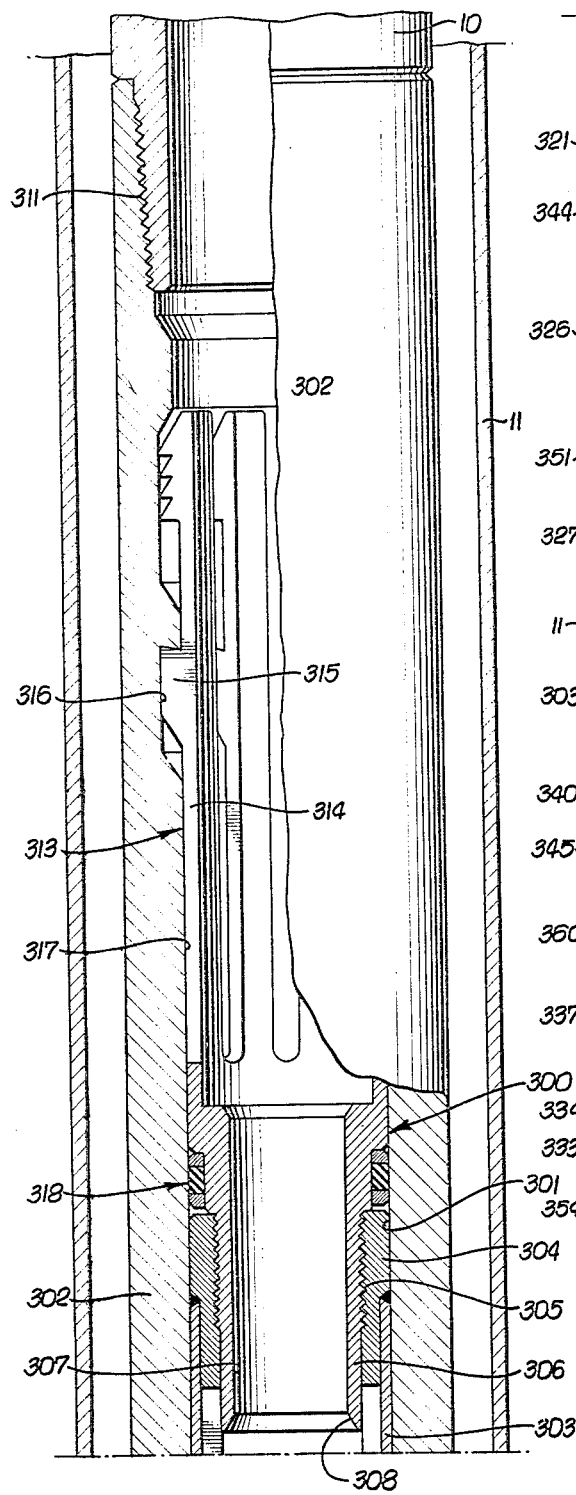
Figure 12B:
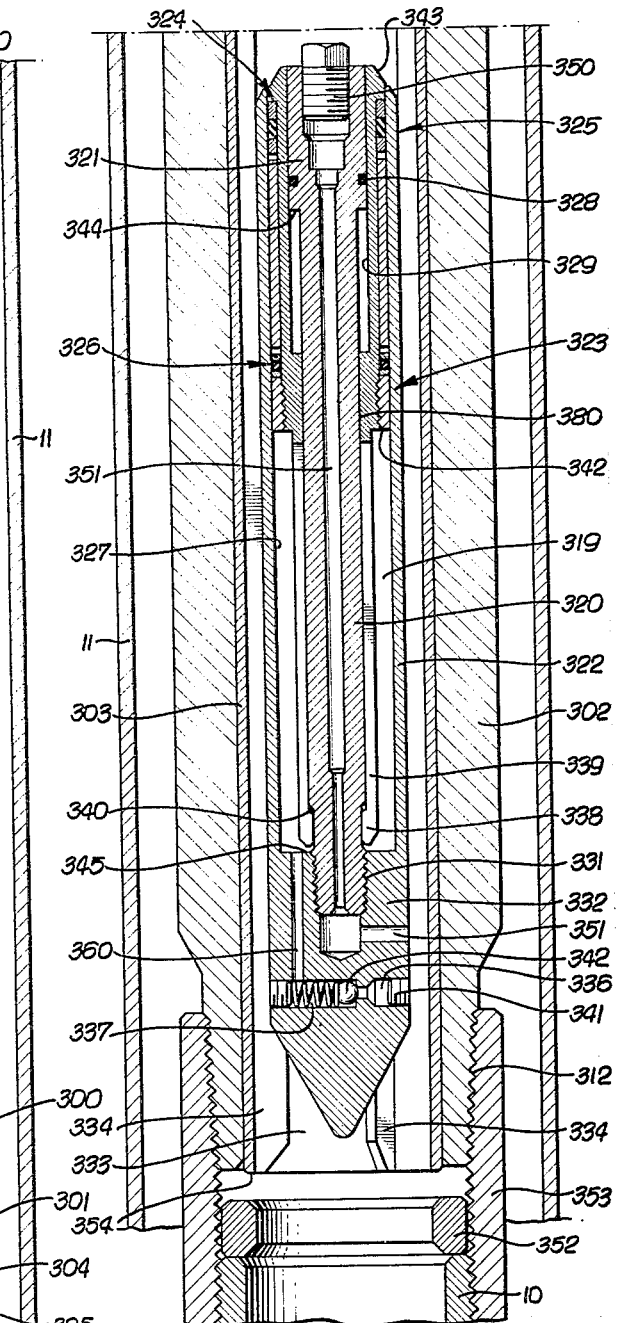

These and other objects and advantages of the invention, as well as the details of an illustrative embodiment, will be more fully understood from the following detailed description of the drawings, in which:

FIGS. 1a and 1b are vertical sections showing one form of the valve assembly installed in a well, the valve plug being open;
FIG. 2 is a view like FIG. 1, but showing the valve plug closed;
FIGS. 3 and 4 are horizontal sections taken on lines 3—3 and 4—4 respectively in FIG. 2;
FIG. 5 is a perspective fragmentary showing of a lower bail portion of the cage in FIG. 2;
FIGS. 6a and 6b are sections showing the FIG. 1 valve being run in tubing by a running tool;
FIGS. 7a and 7b are vertical sections showing the FIG. 1 valve assembly being retrieved by a pulling tool;
FIG. 8 is an enlarged section in elevation showing the approach of a puncturing portion of the pulling tool to a fracture plug on the valve assembly;
FIG. 9 is a vertical elevation showing another form of the value assembly;
FIGS. 10 and 11 are sections taken on lines 10—10 and 11—11 of FIG. 9;
FIGS. 12a and 12b show still another form of the valve assembly in vertical section, the valve being open;
FIG. 13 is a view like FIGS. 12a and 12b, the valve being closed; and
FIGS. 14 and 15 are horizontal sections taken through FIG. 13.

Referring first to FIGS. 1a and 1b, a tubing string 10 is shown within a well which is cased at 11 to form an annulus 12 between the string and casing. Connected in series with the tubing string is what may be referred to as tubular means which may for example include a tubular body 13. The latter has threaded connection at 14 and 14a with the tubing.

Located within the tubular means is an annular seat 15 forming a port 16 through which the well fluid is upwardly flowable under certain conditions. The seat may may be non-metallic, and may be carried on a replaceable ring 17 to face generally downwardly as indicated. Typically, the ring 17 is fitted within a retainer 18 having threaded connection at 19 to a carrier body 20, the latter being inserted downwardly within the tubular body 13 and landed at shoulder 21 therein. In this regard, the carrier may be considered as a part of the overall tubular means referred to above.

The carrier may also be considered to include a collet 22 having spring fingers 23 releasably attachable to the tubular body. For example, the spring fingers project upwardly and have lugs 24 thereon urged radially outwardly into an annular groove 25 sunk in the body bore 26. Thus, upper and lower groove shoulders 27 and 28 provide retention limits for the lugs 24. Finally, a side seal assembly is shown at 29 as including seal ring 30 sandwiched between metallic rings 31 and 32 and carried on the carrier 20 for sealing off between carrier and the bore 33 on the body 13.

In accordance with an important aspect of the invention, control means is provided to form a pre-charged fluid pressurized chamber, the control means including a plug and having piston surfaces respectively exposed to the pressure within the chamber and to the pressure of well fluid within the tubular means but outside the chamber for effecting relative closure of the plug and seat to restrict well fluid flow through the port 16 in response to a drop in well fluid pressure below a predetermined value. In the example shown, the chamber is indicated at 35 as formed by a central rod 36 having a head 37, and by a tubular differential piston 38 extending about the rod. Also, in the example shown, the control means plug is indicated at 39 and having threaded connection at 40 to the piston 38 so as to be movable therewith and below the seat 15, as is clear from the drawings. The plug has a lower position seen in FIG. 1a to allow upward flow of well fluid through the port, and it also has an up position seen in FIG. 2 to block off such flow. A suitable non-metallic seal ring is seen at 41 as carried by the plug to engage the seat and seal off the flow. In the event of wear of the ring 41, the plug upward taper at 42 matches that of the seat and also of the element 17 supporting the seat to assure closure of the plug under all conditions. A seal 43 seals off between the element 17 and the retainer 18 to block escape of pressure from below the valve to the bore 44 within the carrier via the thread 19 when the valve is closed.

Yieldable means may be located within the tubular means, as for example body 13, to transmit force acting to urge the plug away from the seat. In the example shown in FIG. 1, such yieldable means comprises a compression spring 45 located within the chamber 35 to transmit force urging the piston 38 and the plug 39 downwardly. The spring is shouldered between head 37 and flange 46 on the differential piston, as indicated.

The piston 38 is vertically movable on a cylindrical portion 47 of a support 48 receiving the lower portion 49 of rod 36. The lower terminal of support 48 is clamped to the underside of a crosspiece portion 50 of a cage 51 having legs 52 extending downward from body 13 with which the legs are integral. A stem 53 threaded into the rod lower portion 49 at 56 is clamped to the underside of the crosspiece 50, there being seals at 54 and 55 to seal off between support 48 and rod portion 49, and between the support 48 and the stem 53.

The stem 53 and rod portion 49 contain passages 57a and 57b through which pre-charge fluid such as nitrogen or natural gas is delivered to chamber 35. To charge the chamber, a pipe plug 58 is removed from ported plug 59 that seats a ball check 60 urged by spring 61. A pipe nipple is then threaded into plug 59 and pre-charge fluid is charged past the ball check and through passages 57a and 57b into chamber 35, and to a pressure equal to well fluid flowing pressure at the valve location in the well. The nipple is then removed and the plug 58 replaced. After installing the valve in the well and after the well fluid is flowing, there is little or no differential pressure between the pre-charge chamber fluid and the well fluid flowing in the tubing. Therefore, there is little or no possibility of pressure leaking in or out of chamber 35, minimizing the risk of malfunction due to loss of pre-charge pressure in chamber 35.

Referring again to the control means, it includes piston surfaces, as for example at 64 and 65 on the plug 39 and on the flange 46, surface 65 exposed to the pressure within chamber 35 acting to urge the piston and plug up, and surface 64 exposed to the well pressure and acting to urge the piston down. In this regard, the effective area of surface 64 is the total vertically projected area at the top of plug 39 less the total vertically projected area at the underside 66 of the plug, that underside being exposed via port 67 to the well pressure below port 15. Also, the effective area of surface 65 is the total vertically projected area at the underside of flange 46, less the total vertically projected area at the upper side of flange 46. To state the latter another way, the piston bore 68 sealed at 69 is of greater diameter than the piston bore 70 sealed at 71, forming a step on the piston at 65, and a differential area.

When the well fluid pressure declines to a predetermined value less than pre-charge pressure, the pre-charge pressure in chamber 35 is effective to displace the piston 38, plug 39 upwardly to close the valve. In this regard, before such decline in well fluid pressure, a seal 73 is compressed between the lower terminal of the piston 38 and the support 48 to block access of well fluid pressure to the lower terminal of the piston. This seal acts to minimize or reduce the drop in well fluid pressure necessary to initiate closure of the plug 39 toward the seat.

Spring 45 pushes down on the piston 38 to resist closure of the valve. The strength of the spring determines the pressure differential, as between the well fluid pressure and the pressure in chamber 35, at which the valve will close.

It will be seen from FIGS. 2–5 that the plug 39 and piston 38 are vertically movable within the cage 51, and in particular between the cage legs 52. The latter retain the piston and plug against dislodgement from the cage, as for example by virtue of the near matching outer diameter of the piston and inner diameter curvature at 74 on the legs.

Referring to FIGS. 6a and 6b, an example is shown of a running tool means projecting within and attached to the collet for shear release therefrom. Thus, the illustrated tool 100 includes a mandrel 101 suspended at 102 by wireline 103, the mandrel carrying a cup 104. The latter is recessed at 105 to provide frusto-conical taper 106 for retaining the upper terminals 107 of spring fingers 23 in inward position, whereby lugs 24 are free to travel in the string. The mandrel also has telescopic connection at 108 with a tubular stem 109, the lower portion 110 of which holds the valve plug 39 off the seat 15 during running of the valve into a well. At that time, well fluid may pass up through port 16, through passages 110a, 111 and 112 in the stem and into the string above the valve.

Upon landing of the carrier 20 on shoulder 21 of body 13, mandrel 101 continues to move downward for effecting shearing of a pin 113 to release the cup 104 from the mandrel, whereby the collet fingers 23 are released to spring outwardly for reception of lugs 24 into retaining groove 25. When moving downward to shear pin 113, mandrel 101 may telescope downwardly relative to carrier 20 and stem 109, as afforded by telescopic connection 108. The mandrel may then be elevated from the well by wireline 103.

Referring now to FIGS. 7a and 7b, an example is shown of a pulling tool means projecting within the collet to penetrate a frangible element carried on plug 39. That element may for example comprise a plug 120 threaded into a plug bore 121 that communicates via a side passage 122 with the well fluid below the seat 15. Thus, after fracturing of the element 120 by a tapered fracture part 123 on the pulling tool 124, well fluid pressure by-passes through the plug to assure equalization of well pressure above and below the seat 15. The plug is then driven by spring 45 from the seat, as seen in FIG. 7b.

Part 123 is on a pulling tool rod 125 having telescopic connection at 126 with a pulling tool body 127 supported at 128 by wireline 129. As tool 124 is run into a well, fluid passes upward through the body 127 and out through port 130. After element 120 is fractured, a pin 131 connecting rod 125 to body 127 shears to allow body 127 to telescope downwardly over the rod 125. A recesses cup 136 depending from body 127 has inner serrations 137 to cam over and lock onto outer serrations 138 on fingers, urging the fingers inwardly to release from body 13 in response to downward telescoping of body 127 on rod 125. The valve assembly is thus released for upward retrieval from the body 13 and within the string.

In the modified form of the invention seen in FIGS. 9–11, the tubular body 200, carrier 201, seat 202, seat support 203, retainer 204 as well as structure above the carrier remain the same as the corresponding components in FIGS. 1 and 2. The principal differences reside in the control means structure, which includes a pre-charge chamber 205 formed by the central stem 206 carried by the cage 207, and by the vertically movable piston 208 and plug 209 carried on the piston.

The piston is urged downwardly by a compression spring 210 outside chamber 205 and below the seat 202, the spring being retained between inner flange 211 carried by the piston and the flange on head 212 on the stem. Stem 206 is attached to the cage crosspiece 213 as by nut 214, there being a tapered spacer or support 216 held between the upper side of crosspiece 213 and a shoulder 215 on the stem. Inasmuch as the spring is outside chamber 205, there is less reduction of pressure in that chamber as the plug moves upward to close against the seat 202.

Pre-charge pressure in the chamber is exerted upwardly on the under surface 246 of plug 209, tending to close the valve. Well fluid pressure tending to open the valve is exerted downwardly against the upper surface 217 of the open plug. That portion of the under surface 218 of the piston that is of greater diameter than bore 220 is of less vertically projected area than the upper surface 217 of the plug, whereby the net force of well fluid pressure on the plug and piston is downward. When well fluid pressure drops sufficiently, the plug will close against the seat 202, overcoming the spring 210. Note that well fluid pressure enters via port 221 into the spring chamber 222 to act downward on flange 211.

Pre-charge fluid may be charged into the chamber 205 via a plug passage 230 and past a ball check 231 spring urged at 232. Passage 230 is plugged at 233 following such pre-charging. A pin 234 retains spring 232 in position. Plug 209 and piston 208 are vertically movable between the legs 235 of cage 207.

The plug carries a bonded rubber annular seal 236 to seat against the bonded rubber seat 202. The plug also has an annular metal seat 238 to engage and fit the metal seat 237 backing up the seat 202.

Suitable seals are indicated at 240, 241 and 242, and a frangible element 243 is carried on the plug in the same manner and for the same purpose as discussed in FIGS. 1 and 2.

Referring now to the modified form illustrated in FIGS. 12 and 13, the tubular carrier 300 received downwardly in the bore 301 of tubular body 302 includes a depending sleeve 303 acting to protect the body from erosion, as by sand or other abrasive particles carried in the high velocity of well fluid. Sleeve 303 is attached to retainer 304 having thread connection at 305 to an annular extension 306 of the carrier that provides a metallic seat 306 forming a port 308. Body 302 has thread connection at 311 and 312 to a tubing string 10. As before, the carrier may be considered to include a collet 313 having spring fingers 314 releasably attachable to the tubular body. Thus, lugs 315 on the fingers are urged radially outwardly into an annular groove 316 in the body bore 317. A side seal assembly 318 seals off between the downwardly inserted carrier and the bore 317 on the body.

The control means pressurized chamber 319 is formed by a central rod 320 having a head 321 and by a receptacle 322 for a tubular piston assembly 323 extending about rod 320. The control means plug 324 is integral with the piston so as to be movable therewith between a lower or valve open position seen in FIG. 12b and an upper valve closed position seen in FIG. 13. An annular sandwich seal assembly 325 is carried by the plug to engage the seat 307 and seal off the upward flow of well fluid in FIG. 13. Annular seal assembly 326 seals off between the piston and bore 327 of the receptacle, while annular seal 328 seals off between the head 321 and the piston bore 329.

The piston 323 is slidable vertically at 330 on the rod 320, the latter having its lower terminal connected at 331 to the receptacle base 332. Before upward stroking of the piston can begins, lugs 338 on collet fingers 339 must ride over tapered shoulder 340 on the rod 320, resulting in positive closure of the valve. Fingers 339 are carried by the piston 323. The cylindrical receptacle and its downwardly tapering base are centrally supported within a passage 333 formed by protective sleeve 303 as by circularly spaced, vertically elongated webs or fins 334, the latter being attached to the receptacle and sleeve and spaced to allow upward flow of well fluid about the receptacle in valve open condition. It will be noted that the receptacle 322 protects the sides and bottom of the piston against exposure to the high velocity well fluid flow, reducing piston sensitivity to such velocity.

The base 332 contains passages 336, 337 and 360 through which pre-charge fluid is delivered to chamber 319 after plug 341 is removed. A spring urged ball check 342 passes pre-charge fluid into the chamber, but blocks escape thereof. Pressure in chamber 319 acting on piston surface 342 acts to urge the piston up, whereas well fluid pressure acting downward on piston surface 343 acts to urge the piston down. Stop shoulder 344 limits upward stroking of the piston, whereas shoulder 345 limits downward stroking thereof.

When the well fluid pressure drops to a predetermined value less than pre-charge pressure, the pre-charge pressure in chamber 319 is effective to displace piston 323 and plug 324 upwardly to close the valve. Such closure is resisted by the engagement of spring finger lugs 338 with cam shoulder 340, and when the fingers 339 yield outwardly to release the lugs 338 the plug closes toward the seat, whereby the strength of the fingers 339 determines the pressure differential, as between the well fluid pressure and the pressure in chamber 319, at which the valve will close.

Opening of the valve from closed position seen in FIG. 13 requires introducing well fluid pressure down the string. Once the valve is thus opened, the pressure of well fluid at the plug 324 must be sufficient to urge the valve piston to fully open position seen in FIG. 12, in order to prevent re-closure of the valve.

Rupturable pressure equalizing plug and passages are indicated at 350 and 351 respectively. A landing ring 352 within collar 353 may be used to land the bottom terminal 354 of the carrier sleeve 303 when the valve assembly is first run into the well.

I claim:

1. An assembly operable to control well fluid flow in tubing, comprising tubular means, a port forming seat within said tubular means, and control means within said tubular means to control the flow of fluid through said port, said control means forming a pre-charge fluid pressurized chamber and said control means including a plug and having piston surfaces respectively exposed to the pressure within said chamber and to the pressure of well fluid within said tubular means but outside said chamber for effecting relative closure of the plug and seat to restrict well fluid flow through said port in response to a drop in well fluid pressure below a predetermined value, said control means including yieldable means located within said tubular means to resist said relative closure whereby the pre-charge fluid pressure in said chamber may be set near the pressure of well fluid within the tubing and flowing through said port without effecting said relative closure.

2. The assembly of claim 1 in which said chamber extends at the plug side of said seat.

3. The assembly of claim 1 in which said tubular means includes a tubular body and a carrier inserted within said tubular body, said seat and control means being supported on said carrier.

4. The assembly of claim 3 in which said carrier includes a collet having spring fingers releasably attachable to said tubular body.

5. The assembly of claim 3 in which said control means includes a frangible element carried by said plug to block by-passing of well fluid pressure through the valve plug when the valve plug is closed on the seat, said element adapted to be penetrated by a tool inserted through said port to enable said by-passing.

6. The assembly of claim 4 including running tool means projecting within said collet and attached thereto for shear release therefrom, said running tool releasably urging said spring fingers inwardly, and said running tool blocking relative closing of said plug and seat.

7. The assembly of claim 5 including pulling tool means projecting within said collet to penetrate said element, said pulling tool urging said spring fingers inwardly for release from said tubular body.

8. The assembly of claim 3 including a tubing string in which said tubular body is connected in series, the pre-charge fluid pressure in said chamber being near the pressure of well fluid within the string and flowing through said port.

9. An assembly operable to control well fluid flow in tubing, comprising an axially vertical tubular body, a carrier inserted downwardly within said body, an annular seat on said carrier, said seat forming a vertical through port, and control means located within said body to control the upward flow of fluid about said control means and through said port, said control means forming a pre-charge fluid pressurized chamber below said seat and said control means including a plug and having piston surfaces respectively exposed to the pressure within said chamber and to the pressure of well fluid within said tubular body but outside said chamber for effecting upward movement of the plug toward the seat to restrict upward flow of well fluid through said port in response to a drop in well fluid pressure below a predetermined value, said control means including a spring located within said body to resist said upward movement of the plug.

10. The assembly of claim 9 in which said spring is located within said chamber to transmit force acting to urge said plug downwardly.

11. The assembly of claim 9 in which said carrier includes a cage extending below said seat and within which said plug is vertically movable.

12. The assembly of claim 11 in which said control means has a central rod supported by said cage and a tubular differential piston extending about said rod and acting therewith to form said chamber, said piston forming said surfaces and being guided for axial movement by said cage.

13. The assembly of claim 9 in which said spring is located outside said chamber and below said seat to transmit force acting to urge the plug downwardly.

14. The assembly of claim 9 in which said spring comprises a collet having spring finger means with shoulder structure acting to block upward movement of the plug toward the seat, the finger means being yieldable to release the shoulder structure from blocking said upward movement of the plug.

15. The assembly of claim 9 in which said control means includes a piston supporting and movable with the plug and providing said piston surfaces, and a receptacle within which the piston is movable to effect said movement of the plug, there also being means sealing off between the piston and receptacle.

16. The assembly of claim 15 in which said carrier includes a sleeve extending about said receptacle but outwardly spaced therefrom to allow upward flow of well fluid therebetween, the sleeve carrying said receptacle so that the piston sides and bottom are protected from direct exposure to said upward flow.

17. The assembly of claim 9 including a carrier landing ring carried within the tubing and below the lower terminal of said body.

18. An assembly operable to control well fluid flow in tubing, comprising an axially vertical tubular body, a carrier inserted downwardly within said body, an annular seat on said carrier, said seat forming a vertical through port, and control means located within said body to control the upward flow of fluid about said control means and through said port, said control means forming a pre-charge fluid pressurized chamber below said seat and said control means including a plug and having piston surfaces respectively exposed to the pressure within said chamber and to the pressure of well fluid within said tubular means but outside said chamber for effecting upward movement of the plug toward the seat to restrict upward flow of well fluid through said port in response to a drop in well fluid pressure below a predetermined value, said control means including a collet having spring finger means with shoulder structure acting to block upward movement of the plug toward the seat, the finger means being yieldable to release the shoulder structure from blocking said upward movement of the plug.

References Cited

UNITED STATES PATENTS

| 1,641,741 | 9/1927 | Davis et al. | 166—242 XR |
| 2,071,391 | 2/1937 | Crowell | 137—375 XR |
| 2,128,253 | 8/1938 | Johnson | 166—45 XR |
| 2,251,244 | 7/1941 | Stanley | 137—535 XR |
| 2,509,839 | 5/1950 | Panner | 137—515.5 |
| 2,959,227 | 11/1960 | Canalizo | 166—224 XR |
| 3,090,443 | 5/1963 | Bostock | 166—224 |

WILLIAM F. O'DEA, Primary Examiner

R. GERARD, Assistant Examiner

U.S. Cl. X.R.

137—68, 515, 529, 536; 166—224; 251—297